Figure 1A:
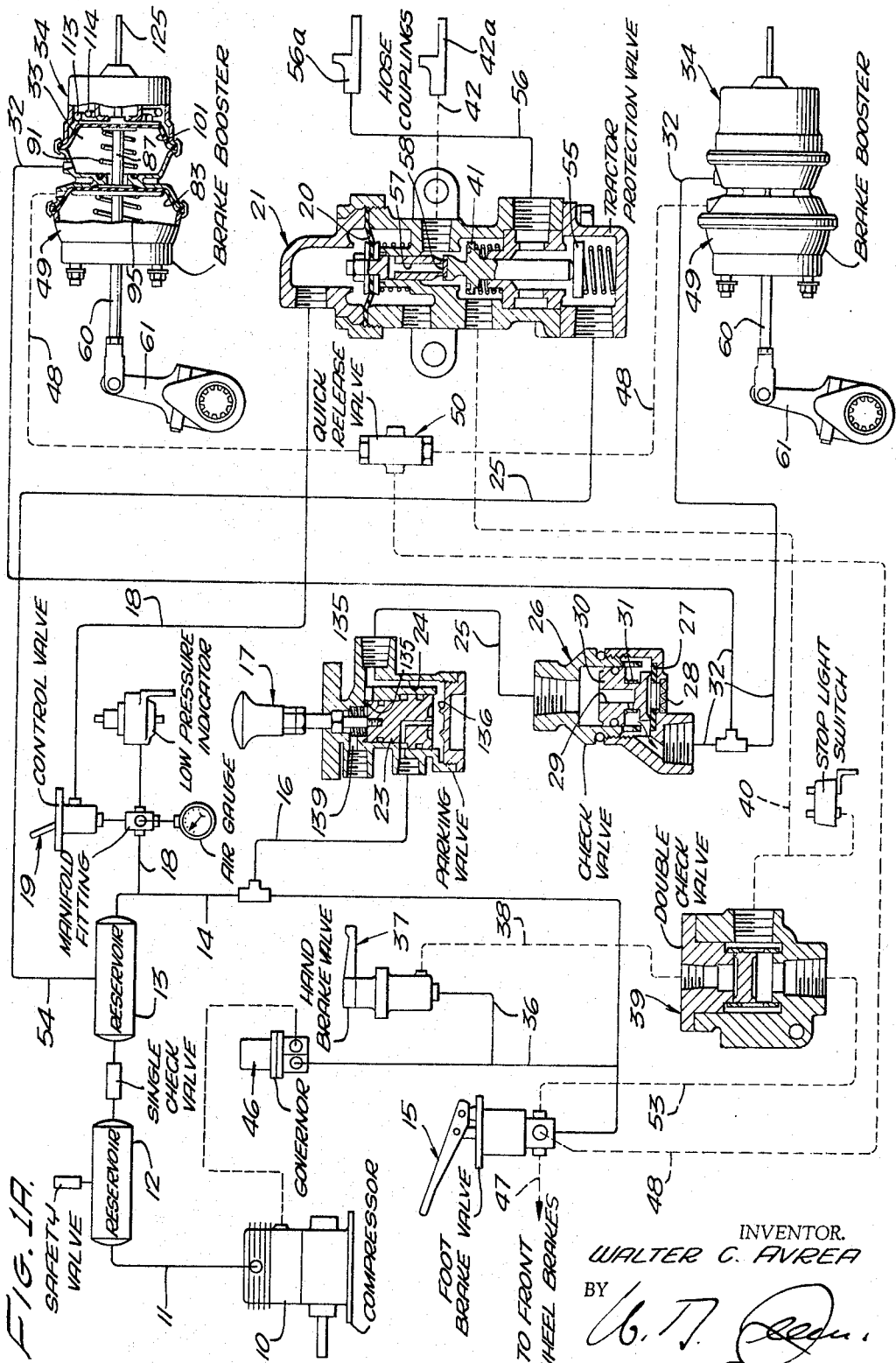

Nov. 15, 1966     W. C. AVREA     3,285,672
FLUID OPERATED BRAKING SYSTEM
Original Filed March 21, 1961     3 Sheets-Sheet 1

INVENTOR.
WALTER C. AVREA
BY
ATTORNEY

Nov. 15, 1966          W. C. AVREA          3,285,672

FLUID OPERATED BRAKING SYSTEM

Original Filed March 21, 1961          3 Sheets-Sheet 2

INVENTOR.
WALTER C. AVREA
BY
ATTORNEY

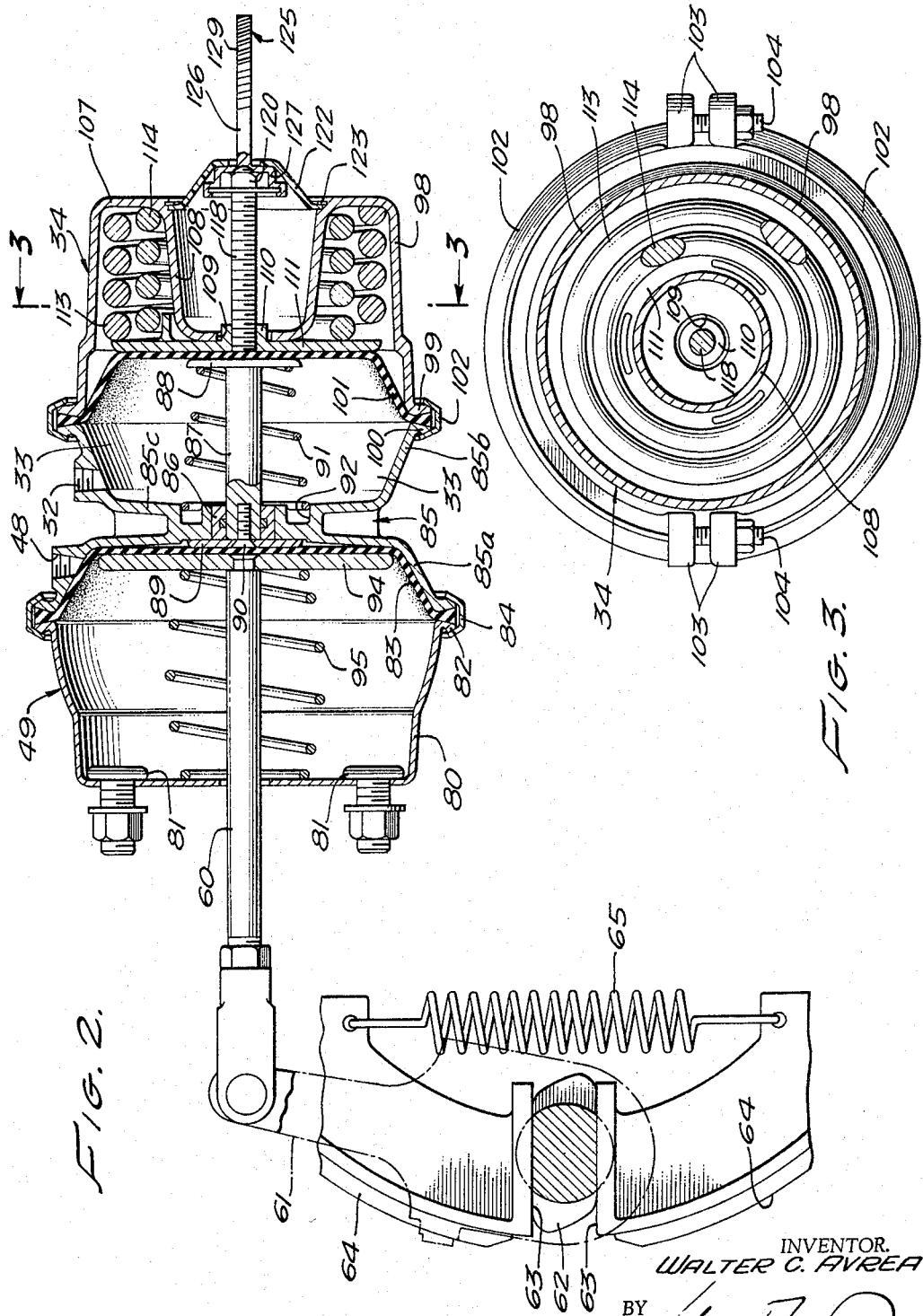

_United States Patent Office_

3,285,672
Patented Nov. 15, 1966

3,285,672
FLUID OPERATED BRAKING SYSTEM
Walter C. Avrea, Placentia, Calif., assignor, by mesne assignments, to Royal Industries, Inc., a corporation of California
Continuation of application Ser. No. 97,368, Mar. 21, 1961. This application June 18, 1965, Ser. No. 467,189
2 Claims. (Cl. 303—9)

This application is a continuation of my copending application for United States Letters Patent Serial No. 97,-368 filed March 21, 1961, which application was a continuation-in-part of my then copending application for United States Letters Patent Serial No. 20,654 filed April 7, 1960. These applications are now abandoned.

This invention relates to power actuated braking systems and more particularly to an improved fail-safe braking system particularly suitable for use on automative vehicles utilizing pressurized air to control the vehicle service brakes and embodying numerous features of novelty including a mechanically powered emergency actuator connectable directly to the service brake booster assembly for setting the brakes under emergency conditions owing to failure or malfunctioning of some part of the main braking system.

The operation and braking requirements of modern day heavy-duty high speed motor vehicles pose serious braking problems under both normal and emergency operating conditions. The power requirements alone are such that it has long been common practice to rely on pressurized fluid to operate booster devices located in close association with each individual wheel to be braked. Associated with these boosters and the control means supplying pressurized fluid thereto are various auxiliary devices responsive to different operating conditions to provide increased flexibility and maximum safeguards against misfunctioning and malfunctioning of the braking system.

Despite the many improvements heretofore provided in braking systems and auxiliaries therefor, there remain many disadvantages and shortcomings directly related to the safety of operation of trucks and the like motor vehicle equipment with pneumatic brakes. Most jurisdictions have stringent laws requiring drivers and those responsible for the operation of such vehicles to inspect the brakes prior to each use of the vehicle. Notwithstanding these regulations and faithful adherence thereto by drivers, it has been found impossible in actual practice to avoid serious accidents for various reasons. For example, in the normal use of the service brakes the operator merely opens an air control valve to admit pressurized air to the booster chamber and he continues to admit more or less air in accordance with braking requirements. Unlike passenger vehicle brakes wherein the operator can judge remaining braking capacity by the proximity of the braking pedal to the vehicle floorboard when the brakes are applied, a pneumatic brake system is actuated by operating an air valve the position of which with respect to its fully opened position bears no significant relationship to remaining braking capacity. This capacity is determined in major part by various factors including the amount of wear on the shoe, the position of the booster diaphragm within its housing, the operating temperatures of the brake shoes and the brake drums, and others. Braking capacity is further determined by the available air pressure and whether or not there is a restriction in the air line to the boosters. A deficiency in any one of these factors limits braking capactiy and effectiveness.

In recognition of these needs and defects in pneumatic braking systems, designers have made many corrective proposals. Despite these, there remain serious inadequacies. In tests to meet these needs, there has been proposed heretofore numerous arrangements of supplemental or auxiliary emergency brake actuators so designed as to be brought into operation to set the brakes upon the occurrence of conditions indicative of dangerous or malfunctioning conditions within the normal braking system. These proposals also have been subject to numerous shortcomings which it is the purpose of the present invention to correct and overcome by the provision of simple, rugged, automatic and positively acting means responsive to a failure of the normal braking system positively to set the brakes until the defect has been acknowledged and corrected.

To these ends the braking system herein disclosed is highly flexible and equally applicable to motor vehicles generally, and trucks, tractors and either individual or tandem operated trailers in particular. The improved system is characterized by the provision of mechanically powered auxiliary brake setting devices suitable for installation either in existing braking systems or for manufacture as a part of original braking equipment. The former version is manufactured as a converter kit having as a principal feature the ease and inexpensive manner by which thousands of existing inadequately braked vehicles can be quickly and safely converted to safe operation meeting the most stringent regulations and safety requirements of governmental authorities responsible for highway and personal safety.

Accordingly, in its simplest form the invention provides a unitary converter assembly adapted to be substituted in lieu of the cover of existing brake booster assemblies and held rigidly assembled thereto by the booster assembly clamp. The only required operating connection is a conduit leading into the continuously pressurized portion of the brake system, preferably by way of a pressure differential check valve and a manually controllable valve operable to employ the emergency actuator units to set the vehicle brakes during vehicle parking. The single conduit connection supplies pressurized fluid to the auxiliary or emergency actuator to hold the powerful springs thereof normally compressed and incapable of influencing or limiting the normal use of the boosters in regulating the brakes in the conventional manner.

Owing to the presence of the pressure differential check valve in the conduit to the emergency actuator, the latter is held locked in deactivated condition by the highest pressure air prevailing at any time in the brake system. Stated differently, even though vigorous and prolonged operation of the service brakes seriously drains and lowers the pressure of the pressurized air therefor, the emergency actuator remains fully cocked and withheld in retracted position until such time as the opening of the differential check valve indicates that the system pressure has dropped to a value too low to operate the brakes with safety. The present system responds automatically to this unsafe condition by utilizing the emergency actuator to set the brakes until the unsafe condition has been rectified.

It will therefore be understood that the emergency actuators of this invention are held fully retracted throughout wide fluctuations of the air pressure but operate immediately to release all air from the emergency actuators as soon as the air pressure falls to a dangerously low value. At this time the energy stored in the compressed springs is released directly to the individual brake boosters to set the brakes and hold them set until the abnormally low pressure condition has been corrected whereupon the restoration of high pressure conditions operate automatically to recompress the emergency actuator springs and release the brakes.

If a parking valve control is present in the air line leading to the emergency actuator, then the operator may operate this valve to vent the air from the actuator to the atmosphere while simultaneously closing the flow of air to the actuator, thereby allowing the compressed springs to set the brakes in the same manner as though there had been a failure of the service line air pressure. In this simple and positive manner the vehicle driver is enabled to park the vehicle with full assurance that the brakes are positively set without fear that a failure of the system air pressure will occur and release the brakes.

Another feature of the invention is the inclusion of indicator means mounted directly on the brake actuator assembly and effective to indicate visually the position of the booster diaphragm with respect to its possible length of travel, thereby indicating the proportion of the available diphragm travel which has been utilized in setting the brakes and additionally, the remaining wear or braking capacity of the brake shoes. The referred to indicator means, being associated with the emergency actuator, is also effective to indicate the position of the emergency actuator diaphragm and of the actuating springs therefor at the time the brakes are set. It will therefore be recognized that inspection of the vehicle braking system is rendered exceedingly simple and requires merely first setting the parking brakes and then observing the indicator mounted on each brake actuator and reading the amount of remaining available travel for the associated diaphragm and brake shoe.

A particularly important feature of the emergency actuator of this invention resides in the simplicity, ruggedness and proven service life of a minimum number of essential components and in particular the absence of close fitting parts and the substantial elimination of close manufacturing tolerances. Instead, a high-strength fully proven rubber diaphragm is employed in cooperation with high pressure air to hold the powerful springs compressed until needed in the emergency setting of the brakes. Prior emergency actuators are inferior in being dependent on the use of spring pressed pistons having a high-tolerance sliding fit with a supporting cylinder. Furthermore, the piston is required to be held in retracted position by air pressure acting thereagainst. The high pressure air required for this purpose would easily leak past the piston except for the provision of special sealing rings such as rubber O-rings. These tend to cold flow under static operating conditions typically prevailing in such assemblies. These sealing rings are also seriously affected by wide temperature fluctuations and by a decided tendency of the rubber material to adhere to the cylinder walls with resultant tearing and damage to the rings upon movement of the piston. As will be readily recognized, piston type actuator assemblies are time consuming and costly to manufacture, service and maintain. Furthermore, failure of the sealing ring for the piston is inevitable and unpredictable. If this occurs while the vehicle is traveling at high speed, serious consequences to life and property are unavoidable.

In view of the foregoing, it is a primary object of the present invention to provide an improved fail-safe fluid operated braking system for motor vehicles.

Another object of the invention is the provision of a simple unitary rugged converter especially designed for addition as an auxiliary to existing operating braking systems by which such systems are converted to positive fail-safe operation upon a drop of the system pressure below a predetermined safe operating value.

Another object of the invention is the provision of a fail-safe emergency brake actuator adapted to be installed as a substitute for the cover of the brake booster assembly of vehicle brake systems already in service.

Another object of the invention is the provision of a compact powerful brake actuator assembly incorporating as part thereof the normal service brake booster and, a fail-safe emergency brake actuator effective to set the brake upon loss of the system air pressure.

Another object of the invention is the provision of an improved vehicle braking system incorporating fail-safe automatically-setting means featuring the use of a simple control valve operable to utilize the fail-safe actuator to set the brakes so long as the vehicle is parked.

Another object of the invention is the provision of an improved pneumatic braking system featuring fail-safe emergency actuator means for each brake assembly in combination with differential pressure responsive check-valve means operable to hold the fail-safe mechanism fully cocked through wide-range fluctuation of the system pressure but responsive to abnormal decrease in the system pressure to release the fail-safe mechanism and stop the vehicle.

Another object of the invention is the provision of a fail-safe actuator for the vehicle brakes utilizing powerful spring means to set the brakes and incorporating manually manipulatable means for locking the springs retracted to permit safe servicing and inspection of the emergency actuator as well as to release the vehicle brakes to permit removal of the vehicle from the highway following operation of the emergency actuator.

Another object of the invention is the provision of simple, inexpensive, positive indicator means facilitating the accurate checking of the operating conditions of the brake operating means as well as of the braking capacity of the brake shoes by inspection personnel prior to the use of the vehicle.

Another object of the invention is the provision of an improved unitary brake actuator assembly utilizing pressure operated diaphragm means to operate the service brakes and a second diaphragm in close association therewith to hold the fail-safe actuator means normally retracted.

These and other more specific objects will appear upon reading the following specification and claims and upon considering in connection therewith the attached drawings to which they relate.

Referring now to the drawings in which a preferred embodiment of the invention is illustrated.

Figure 1B:
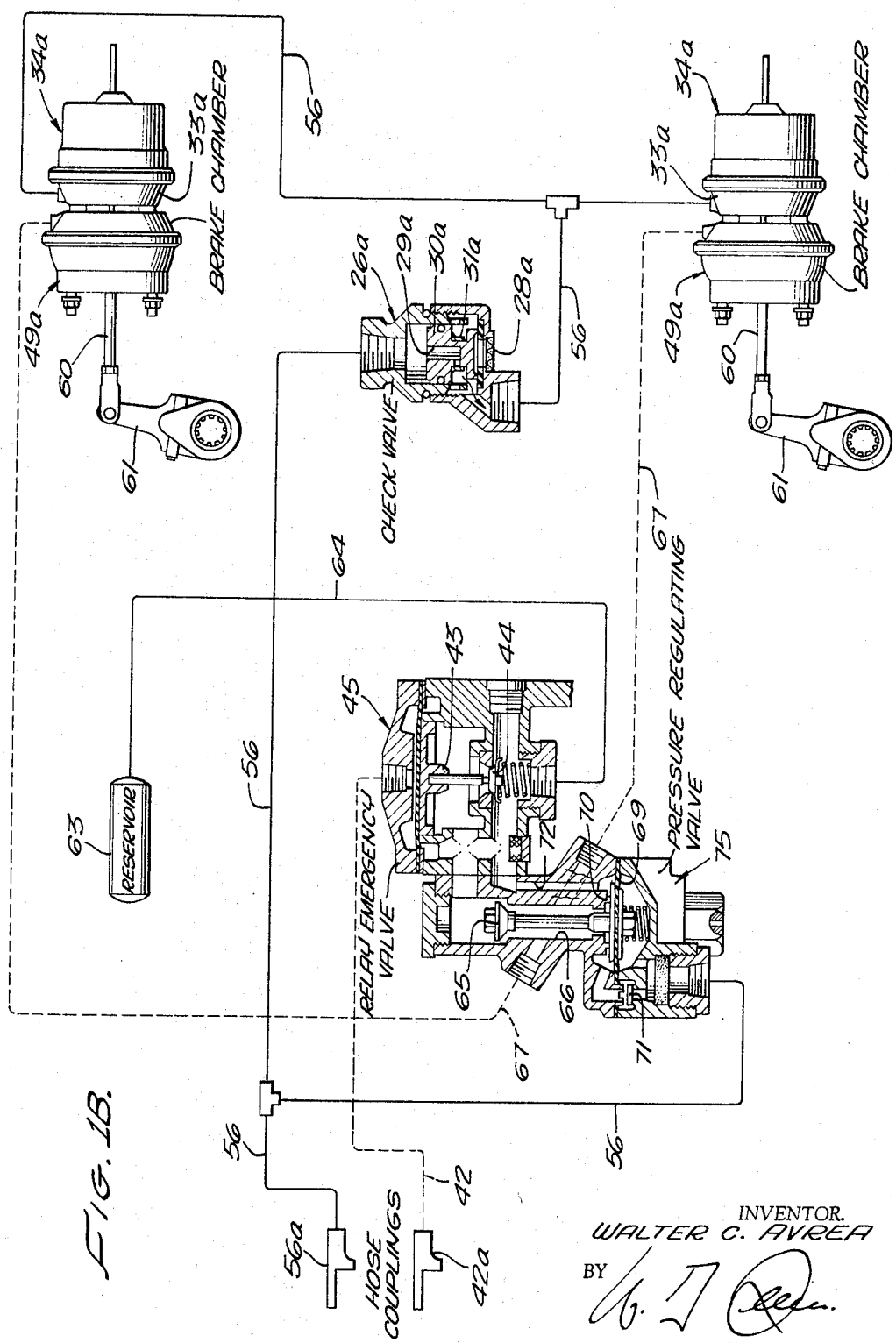

FIGURES 1A and 1B, taken together, are a schematic representation of a pneumatic braking system incorporating the present invention, FIGURE 1A representing the the portion of the system normally mounted on an individual truck or on a tractor and FIGURE 1B representing the portion of the system mounted on a trailer;

FIGURE 2 is a fragmentary view on an enlarged scale of the emergency actuator assembled to the brake booster and the associated braking shoes; and FIGURE 3 is a cross-sectional view through the emergency actuator taken along line 3—3 on FIGURE 2.

Referring more particularly to FIGURES 1A and 1B there is shown a preferred embodiment of a fail-safe braking system incorporating the features of the present invention. As will be recognized by those skilled in this art, certain of the components are of conventional construction operating in known manner to perform various functions associated with braking the vehicle; other of the components are original with this invention or are structurally and functionally associated with one another in a novel manner.

The portion of the present braking system installed on an individual truck or on a towing tractor is illustrated in FIGURE 1A and will be described first. It is pointed out that all conduits shown in solid lines indicate conduits normally maintained under air pressure while those shown in dotted lines represent conduits under pressure only at certain times as, for example, when the brakes are being applied under normal serivce conditions.

The tractor braking system

The braking system includes a compressor 10 understood as driven by the truck engine and operable to deliver air under pressure through line 11 to storage reservoirs 12 and 13. Reservoir 13 is connected by conduit 14 to the inlet of the main or foot operated brake control valve 15 and by a branch conduit 16 discharging through the side wall of a parking valve 17. A third conduit 18 emanating from reservoir 13 conducts pressurized air through a normally open control valve 19 leading to the upper side of a diaphragm 20 mounted across the upper end of the tractor protection valve 21 in accordance with customary practice.

Referring back to park valve, it is pointed out that the single movable valve element 23 of that valve is normally held in its shown upper position for reasons to be explained below with the result that the high pressure air entering the parking valve by way of conduit 16 exits, flows through the L-shaped passage in valve member 23, through passage 24 and conduit 25 into a differential pressure check valve 26. The movable valve element 30 of the latter is normally seated against gasket 27 thereby closing the atmospheric vent opening 28. For this reason the pressurized air passes through the central passage 29 of valve element 30 and outwardly past the circular rubber band type check valve 31 and through conduits 32 into chambers 33 of the separate emergency brake actuators designated generally 34 and forming a most important component of this invention.

Referring to the left-hand end of FIGURE 1A, it will be observed that the high pressure line 14 is also connected through conduit 36 with the inlet of the hand braking valve 37 conveniently positioned for operation by the vehicle driver and useful under certain slippery and hazardous driving conditions to admit service braking air to the trailer brakes independently of the towing tractor brakes. Thus, when hand valve 37 is held open pressurized air discharges are admitted into conduit 38 for flow into a double acting check valve 39 moving the shuttle-like movable valve element to its alternate position thereby routing the pressurized air through conduit 40 and past open valve 41 of tractor protection valve 21 for delivery through the flexible hose connection 42 coupled by coupling 42a to the upper side of a piston 43 (FIGURE 1B) controlling the position of a valve 44 of the relay emergency valve 45. The manner in which the pressurized air supplied to the upper side of piston 43 functions to apply the trailer service brakes will be described in greater detail below.

Referring again to the left-hand end of FIGURE 1A, it is pointed out that the compressor governor 46 is connected between line 36 and conventional unloading mechanism of compressor 10 operable in known manner to maintain the compressor in operation as long as necessary to maintain the air pressure in reservoirs 12 and 13 above a predetermined minimum value such as 85 p.s.i. and to cut off the compressor when the pressure in the reservoirs reaches a predetermined maximum value, such as 110 p.s.i.

Operation of the service brakes is normally initiated by depressing foot valve 15 with the driver's foot thereby admitting pressurized air into distributing line 47 leading to the individual brake boosters (not shown) for the front wheel brakes and simultaneously to line 48 leading to the individual brake bosters (not shown) for the usual quick release valve 50. Details of boosters 49 will be described presently. As is well known, quick release valve 50 functions automatically to vent air from the boosters following removal of the driver's foot from brake valve 15.

At the same time foot valve 15 is opened to activate the brake boosters in the usual manner, pressurized air is also admitted to conduit 53 leading through the lower end of double check valve 39 to admit pressurized air to conduit 40. This air flows past open valve 41 of the tractor protection valve and thence through conduit 42 into the braking system of the trailer if one is coupled to the towing tractor and is effective to apply the service brakes of the trailer in a manner which will be described presently.

Still another conduit not previously described in FIGURE 1A is the conduit 54 extending from air reservoir 13 to the lower end of tractor protection valve 21 for flow past the normally open valve 55 therein and thence into flexible hose 56 and coupling 56a detachably connecting the tractor to the trailer braking system. In this conection it is pointed out that the service line pressure normally acting on the upper side of diaphragm 20 of the tractor protection valve is effective to hold the vent porting passage 57 of tractor protection valve 21 seated against packing material 58 as well as to hold valves 41 and 55 in the open position shown in FIGURE 1A so long as control valve 19 is open. Valve 19 is maintained in open position so long as a trailer is coupled to the tractor braking system and the vehicle is in actual service; otherwise control valve is closed in which case tractor protection valve 21 is deactivated and each valve member thereof is closed upwardly.

The trailer braking system

Referring to FIGURE 1B there is shown the portion of the braking system typically installed on a tractor hauled trailer. At least the wheels carried by the rear axle are equipped in the usual manner with separate brake boosters 49a for setting the brake shoes. For this purpose the booster diaphragm is connected through a rod 60 with the brake shoe setting crank arm 61 functioning through the double ended cams 62 against the ends 63 of the brake shoes 64 (FIGURE 2) to expand these shoes against the cylindrical portions of the brake drum, not shown. When pressure is not supplied to the brake boosters a tension spring 65 connected across the adjacent ends of the brake shoes functions to retract the shoes away from the brake drums to the position shown in FIGURE 2.

As was mentioned above in connection with FIGURE 1A, there are two air conduits interconnecting the trailer and the tractor brake systems, namely, the normal braking service line 42 and the emergency air line 56 each provided with a separable fast action coupling device 42a, 56a, respectively. As is indicated by the full line showing of line 56, this conduit is maintained under the pressure of the tractor air reservoirs 12 and 13 at all times. On the other hand the service brake line 42 is supplied with pressurized air only when the vehicle operator opens either the foot-operated brake valve 15 or the hand brake valve 37. The pressurized air then supplied to conduit 42 is not directly employed to set the trailer brakes; instead it merely depresses piston 43 of relay emergency valve 45 on the trailer. When piston 43 is depressed from its shown normal position it opens valve 44 thereby admitting high pressure air stored in trailer reservoir 63 for flow through line 64 into relay valve 45, past open valve 44, past the open emergency valve 65 and into chamber 66 from which it flows through lines 67 into brake boosters 49a, 49a. This results in setting the trailer brake shoes and holding them set in accordance with the air pressure allowed to exist in the boosters so long as master brake valve 15 or hand brake valve is held partially or fully open. Immediately upon closing of the control valve, the pressure in line 42 is vented to the atmosphere through quick release valve 50 (FIGURE 1A). The high pressure air then acting on the lower side of piston 43 of emergency valve 45 moves piston 43 upwardly thereby effecting the closing of valve 44 cutting off the supply of air from trailer reservoir 63 to boosters 49a.

Trailer reservoir 63 is maintained charged with air via emergency line 56 which has a branch connection leading into the lower left-hand corner of emergency valve 45. Whenever there is a need for additional air in reservoir 63, the high pressure air in line 56 enters the lower left hand corner of emergency valve 45 and acts against the lower side of emergency diaphragm 69 to hold the latter pressed upwardly against seat 70. The pressurized air entering the emergency valve from line 56 then flows past check valve 71 into the chamber above emergency diaphragm 69, thence through passage 72 into the chamber on the underside of piston 43 as well as past the lower side of valve 44 into conduit 64 and thence to reservoir 63.

It is also pointed out that there is associated with emergency diaphragm 69 a pressure regulating valve indicated generally by reference 75. This pressure regulator is of conventional construction well known to this art and operates in known manner to govern and smooth out the operation of the emergency valve.

Relay emergency valve 45 serves highly important functions in addition to those just mentioned. The more important of these will be mentioned in brief before proceeding to a description of other components. For example, if the trailer should become uncoupled from the tractor accidentally or otherwise, there is an immediate loss of pressurized air from normally charged conduit 56. When this occurs the pressure on the underside of the emergency diaphragm 69 is lost allowing the pressure of trailer reservoir 63 to depress diaphragm 69 thereby seating valve 65 downwardly and unseating this diaphragm from seat 70. The high pressure air on the upper side of this diaphragm 69 also holds check valve 71 seated preventing the loss of air through the broken or uncoupled line 56. The downward movement of diaphragm 69 also admits high pressure air from the reservoir into chamber 66 from which it is distributed through lines 67 to brake boosters 49a, 49a to set the vehicle brakes and hold them set until the trailer is recoupled to the tractor and the tractor main line pressure is re-established in line 56.

Another highly important function of the high pressure air normally existing in conduit 56 is to maintain chamber 33a of the emergency brake actuators 34a charged with high pressure air. To this end high pressure conduit 56 includes a pressure differential check valve 26a identical in construction and function with the similar valve 26 described above in connection with FIGURE 1A. Hence, it will be understood that air is held charged in chambers 33a by valve 26a at the highest pressure ever existing in line 56.

*The emergency brake actuator and the fail-safe features of the invention*

The fail-safe aspect of the invention will be best understood from the description of a representative one of the emergency brake actuators and its structural and functional relationships to an associated brake booster shown in FIGURES 2 and 3. In this connection it will be understood that each of the service brake operating boosters 49 and 49a are similarly constructed and operated.

As is well known to those skilled in this art conventional pneumatically operated brake boosters include a generally cup-shaped housing 80 having fixedly secured to the bottom thereof mounting bolts 81 rigidly securing the brake booster to bracket means (not shown) of the vehicle chassis. The outwardly flaring rim lip 82 of housing 80 seats the ribbed rim of a heavy duty flexible rubber diaphragm 83 normally clamped in place against lip 82 in existing brake booster equipment by a deeply dished cover flanged at its rim similarly to lip 82 and held tightly assembled to the latter along with the diaphragm by a split ring clamp 84. The referred to dished cover is not shown in FIGURE 2 because it has been discarded and replaced by the similarly shaped left-hand end of an unitary housing and mounting assembly 85 forming an important component of the fail safe emergency actuator 34.

The unitary housing 85 includes a deeply dished forwardly facing cup 85a and a similarly shaped rearwardly facing cup 85b. The common bottoms 85c of these members constitute a dividing partition formed axially thereof with a bore seating a fluid tight bearing 86. Slidably supported in bearing 86 is a cylindrical pusher member 87 provided at one end with an integral disc 88. A second and removable disc 89 is secured to the other end of pusher 87 as by a screw 90. The spool-like pusher assembly 87 is spring biased to the right as viewed in FIGURE 2 by a helical spring 91 having its inner end seated in an annular groove 92 formed in partition 85c and its smaller diameter end bearing against the surface of disc 88. Accordingly, so long as pressurized air is present in actuator chamber 33, pusher 87 is held retracted to the right with its disc flush against partition 85c, as is illustrated in FIGURE 2.

In accordance with conventional brake booster construction practice, booster rod 60 is also provided with a large area disc 94 riveted or otherwise secured to the inner end of this rod. Disc 94 is held pressed against the forward side of booster diaphragm 83 by a heavy duty helical coil spring 95 enclosed within booster housing 80. The normal tractor brake service line 48 or trailer brake service line 42, 67 are connected to the right-hand side of booster diaphragm 83 and supply pressurized air to this side of the diaphragm to force it to the left as viewed in FIGURE 2 along with rod 60 to pivot cam operating brake arm 61 counterclockwise to set the brake shoe when valves 15 or 37 are opened.

Emergency actuator 34 includes a high strength cup-shaped housing 98 provided at its rim with an outwardly projecting beveled flange 99 which cooperates with the similarly flanged portion 100 of cup-shaped housing 85b to grip the ribbed rim of a heavy duty rubber diaphragm 101. Housings 85b and 98 are held rigidly assembled against the opposite rim edges of diaphragm 101 by a powerful clamping band 102. As is shown in FIGURE 3, clamping band 102 is formed in two halves each provided at their ends with integral lugs 103 projecting laterally therefrom and provided with holes seating clamping bolts 104.

The bottom or end wall 107 of actuator housing 98 is provided with a deeply recessed or re-entrant portion 108 formed with an axial opening 109 loosely receiving hub 110 of a spring follower disc 111 bearing against the right-hand side of the actuator diaphragm 101. Circling re-entrant portion 108 of housing 98 are two concentric and powerful coil springs 113 and 114 having their outer ends bearing against the end of housing 98 and their inner ends bearing against follower disc 111. Spring 113 and 114 are extremely powerful and desirably are capable of exerting a combined force of approximately 800 pounds against follower disc 111 when the springs are extended fully to the left with diaphragm 101 lying pressed against partition 85c. Normally however, the springs are held compressed to the right by reason of the high air pressure trapped in chamber 33 on the left side of diaphragm 101.

This air pressure is supplied to actuator chambers 33 of each fail-safe actuator 34 or 34a through the high pressure supply line 32 of the tractor or line 56 of the trailer brake system. It will, therefore, be understood that so long as adequate high pressure conditions exist in the vehicle brake system, the powerful actuator springs 113, 114 are maintained compressed and in readiness to set the brake shoes should an emergency arise. It is also pointed out that so long as chambers 33 are charged with air, pushers 87 are held extended to the right as viewed in FIGURE 2 by springs 91. Hence, disc 89 is in contact with the left-hand side of partition 85c and disc 88 is in contact with diaphragm 101. Under these conditions it will be apparent that boosters 49 are in readiness to operate the brake shoes in the normal manner without interference from pushers 87 or emergency actuator springs 113, 114.

However, should there be a failure of pressure in actuator chambers 33, then springs 113, 114 are instantly responsive to release their stored energy against diaphragms 101 forcing these along with pushers 87 to the left thereby forcing booster diaphragms 83 and the low brake rods 60 to the left to set the brake shoes and hold each pair thereof set with an applied force of approximately 800 pounds or greater.

In the foregoing description of actuator 34 reference has been made only to the use of a clamping device 84 to hold the actuator assembled to booster casing 49. However, it is to be understod that some booster casings are made with flanged rims using cap screws or through bolts to hold the booster end cap assembled to the main booster casing. In this case the booster diaphragm is larger in diameter and formed with holes to receive the shanks of the assembly fasteners. It is to be understood that the actuator of this invention is equally suitable for use with either type of brake booster, it merely being necessary to form the rim of housing 85a with a wider radial flange and to provide the necessary holes for the assembly bolts.

To permit assembly and disassembly as well as servicing of the emergency actuator 34, it is important that adequate safeguards be provided in the form of a safety lockout to hold the actuator springs compressed. To this end, each actuator is equipped with a threaded stem 118 threaded into hub 110 of follower 111. Stem 118 projects beyond the bottom 107 of re-entrant portion 118 by a distance fully adequate to permit full travel of pusher 87. Assembled to the outer end of stem 118 is a close fitting nut and attached washer assembly 120. When this nut is run along stem 118 by a wrench to a position adjacent hub 110 of the spring follower plate, the washer carried by the nut projects well beyond the rim of hole 109 thereby positively preventing movement of follower plate 111 to the left. In this manner nut 120 and stem 118 cooperate with the follower and with re-entrant portion 108 to hold the springs compressed, a precaution which must be taken before attempting to assemble or disassemble the actuator housing assembly clamp 102.

It is also pointed out that the described lockout means for holding the springs mechanically compressed permits truck service personnel or law enforcement officers to compress the actuator springs and release the vehicle brakes following normal operation of the fail-safe actuators to meet an emergency condition. Were it not for the lockout or spring deactivating means 118, 120, it might not be possible to move the vehicle from a highway without the long delay required to restore the brakes to proper operating condition following their failure while in service.

The described mechanical spring retractor is preferably shielded against road dirt and water as by an easily destroyed plastic cover 122 held seated about lockout stem 118 and nut assembly 120, as by a split ring keeper 123 seated in an annular recess formed at the outer end of re-entrant portion 108.

Brake condition indicator

A further novel feature of the invention relates to a simple inexpensive indicator associated with emergency actuators 34 and designated generally 125. By means of this indicator, operating personnel are enabled to check the condition of the brakes and to obtain a highly reliable indication of reserve braking capacity prior to each use of the vehicle. As here shown, indicator 125 comprises a unitary member having the configuration shown and desirably formed of rubber, plastic, or the like material. This indicator includes an elongated stem portion 126 integral with a cupped inner end 127 formed to fit snugly but detachably about the nut and washer assembly 120. Indicator stem 126 may be formed with brightly colored bands or rings 129 of differing colors or widths or otherwise designed for easy reading from a distance. These indicator bands remain exposed beyond the outer end of the protective cover disc 122 for the lockout device, the exposure length being indicative of the remaining permissible travel of brake rod 60 before exhausting the travel capability of the brake boosters or the thickness of brake shoe linings. In this connection it is pointed out that inspection of the vehicle brakes and their condition of wear is carried out while the vehicle is parked with the brakes set. Under these conditions no air is present in actuator chambers 33 with the result that actuator springs are fully released and effective to hold brake shoes 64 set against the brake drums. Knowing the brakes to be fully set so long as the truck is parked, the inspector checks the brake condition simply by visually noting the proportion of the outer end 129 of indicator stem 126 exposed beyond the outer end wall of protective cover 122. If a major number of indicator rings 129 are visible, the inspector knows that the brake shoes are in serviceable condition and that the brake boosters are properly adjusted with ample reserve movement capability. In other words, the exposed length of indicator 129 when the vehicle is parked is indicative of the remaining thickness of the brake shoes and of the possible axial movement of the brake boosters. Since the brake mechanism of each wheel is equipped with its own individual indicator a visual check is obtainable very quickly for each individual wheel.

A further advantage of the brake condition indicator mechanism is the fact that it is quite as effective to indicate the condition of the brakes after a period of actual operation as it is prior to initiating a run. Thus, let it be assumed that the driver has been using the brakes extensively while descending a sharp grade. Being dubious as to whether the use of the brakes has caused heating and expansion of the brake drums to a dangerous degree, the driver has but to pull off the road and release the air from holding chamber 33 of the emergency actuator 34 thereby allowing the emergency springs to set the brakes. This having been done, he inspects indicators 125 of each actuator assembly noting the length of indicator stem 126 projecting beyond the outer end of cover 122. Normally, a shorter length of the indicator will then project beyond cover 122 because of the expanded condition of the brake drums while hot. If the drums are overexpanded or if the brake shoes are worn excessively, such conditions will be accurately denoted by the short extension of the indicators beyond cover 122.

Should indicators 125 become damaged for any reason they are quickly and easily replaced by a new one simply by removing cover 122 and assembling a new one onto nut assembly 120.

Operation of the parking valve and the pressure differential check valves

Important auxiliaries of the disclosed fail-safe braking system include parking valve 17 and the two pressure differential check valves 26, 26a, one of which is located between pressurized air conduits 25 and 32 (FIGURE 1A) and the other of which is located in conduit 56 of the trailer emergency air line and employed to supply air to chambers 33 of emergency actuators 34, 34a.

Referring first to parking valve 17 it is pointed out that the single movable valve member 23 is formed recessed or stepped intermediate its opposite ends with the result that it has a greater area on its lower end exposed to the high pressure line when it is seated upwardly against annular seat 135. On the other hand, when valve 23 is seated downwardly against its lower annular seat 136, the high pressure air in supply line 16 cannot flow through the L-shaped passage of valve 23 into outlet passage 24. In consequence the high pressure acting against the annular shoulder about the midsection of valve 23 is effective to hold it closed downwardly. Under these circumstances the pressurized air present in conduit 25 escapes through passage 138 and past seat 135 to the atmosphere by way of vent 139.

From the foregoing it will be understood that parking valve 17 occupies one of two alternate positions in one of which it is held seated against seat 135 (as shown in FIGURE 1A) by the pressure existing in air line 16, and in the other of which valve 23 is held against seat 136 by the air pressure in line 16. In the latter position conduit 25 is vented to the atmosphere as explained in the preceding paragraph.

Referring now to the differential pressure check valve 26 it is pointed out that so long as line pressure is present in conduit 25 check valve 30 is held seated against gasket 27. Air from conduit 25 can flow through axial passage 29 of the valve and past the elastic sleeve band 31 and thence through conduits 32 to chambers 33 of the emergency actuators 34 until chambers 33 become fully charged. If the reservoir air pressure rises, additional air is bled past elastic sleeve 31 of the check valve into actuator chambers 33 and self-seating action elastic sleeve 31. In this manner chambers 33 are maintained charged with air at the highest pressure ever existing in the reservoir thereby assuring that the actuator springs 113 and 114 will be maintained fully compressed at all times. The importance of this resides in the fact that except for this capability the springs of the actuators would be partially released during decreases in the air line pressure occurring during prolonged or excessive use of the brakes.

The importance of this will be recognized from the following discussion of a typical operating condition. Let this be assumed, for example, that the truck is descending a long grade and that foot valve 15 is maintained in approximately open position for a prolonged period sufficient to deplete the reserve supply of air in reservoirs 12 and 13. In these circumstances the service line pressure may drop appreciably below the normal operating pressure of say 110 p.s.i. Despite the dropping pressure level in the reservoir and in the service line, check valve 26 positively locks the air trapped in actuator chambers 33 at the maximum value ever reached in the brake system. Let it be assumed that the continued application of the brakes results in lowering of the air pressure to an unsafe operating value, such as to 65 p.s.i. Under these circumstances check valve 26 is so designed as to open upwardly due to the fact that the high pressure acting on the lower end of valve 30 outwardly of check valve sleeve 31 is effective to overbalance the relatively low pressure acting on the upper end of valve 30. In consequence, the higher pressure shifts valve 30 upwardly off its seat on gasket 27 thereby allowing the high pressure air in emergency actuator chambers 33 to escape to the atmosphere through vent 28 of check valves 26, 26a, an action which takes place very quickly allowing the powerful emergency springs 113, 114 of the actuators to set the brakes.

In the manner described, it will be understood that the check valve functions to assure maintenance of the highest existing line pressure in chambers 33 at all times and additionally, to respond automatically to unsafe pressure conditions in the system occuring for any reason. When released the emergency actuators set each of the service brakes and hold them set in a positive manner under the mechanical and positive power of the actuator springs.

Simultaneously with the upward opening of the differential check valve the high pressure air in conduit 25 bleeds past the elastic band 31 and escapes to the atmosphere allowing the spring at the upper end of valve member 23 in the parking valve to shift the latter downwardly against seat 136 where it remains until manually pulled upwardly against seat 135. Under these circumstances the continued operation of compressor 10 may be effective to restore the system pressure in reservoirs 12 and 13 but this pressure cannot be communicated to actuator chamber 33 because parking valve 23 is closed and held closed by the line pressure prevailing in conduit 16. An increase in the line pressure in conduit 16 merely functions to hold parking valve the more firmly against seat 136.

Owing to the fact that the outlet of the parking valve is connected to the emergency actuators of the tractor through check valve 26 as well as to the emergency actuators of the trailer through a similar check valve 26a, it will be recognized that the emergency actuators of the trailer are controlled in the same manner and are subject to the same safeguards as are the actuators for the tractor. There is the difference that the trailer emergency actuators are subject to being cut off or deactivated by closure of valve 55 in the lower portion of tractor protection valve 21. Normally, this valve is open so long as control valve 19 remains open, it being standard practice to keep valve 19 open so long as the vehicle is in use, and closed only when the vehicle is being stored. It is also pointed out that should the trailer become disconnected accidentally or for any other reason, coupling 56a in line 56 malfunctions and permits loss of air pressure in line 56, valves 41 and 55 of the tractor protection valve close in a manner well understood by those familiar with such valves.

Let it now be assumed that after a period of use the driver has stopped the truck and wishes to park it in a braked condition without possibility of the vehicle moving from its parked position. By the present invention this is done without risk and without reliance on air pressure in any way without dispensing with the use of the brake boosters to set the brakes. Thus, the driver merely depresses parking valve handle 17 to move its valve 23 downwardly against seat 136. The valve is manually held in this position momentarily while the pressure in conduit 25 bleeds to atmospheric vent 139 by way of passage 138. A sudden drop of pressure in conduit 25 leading to the upper ends of the differential check valves 26, 26a allows the higher pressure then prevailing against the lower ends of movable valve elements 30, 30a to move these elements upwardly to vent air from actuator chambers 33, 33a to the atmosphere by way of vent openings 28, 28a. As soon as this occurs powerful springs 113, 114 of each emergency actuator are free to shift actuator diaphragms 101 toward the brake boosters and to set the brake shoes. As soon as the brakes have been set by the actuators the vehicle may be left with full assurance that it cannot be moved from its parked position irrespective of whether the vehicle engine is operating.

It therefore will be evident that development of a leak or the malfunctioning of any part of the pneumatic system cannot possibly result in release of the brakes while the vehicle is parked and unattended. In fact, the release of the brakes can only be effected by effective air pressure conditions in the service lines above the predetermined minimum value required to hold check valves 26, 26a seated across their respective atmospheric vents. Otherwise, it is impossible to recharge actuator chambers 33 with air to compress springs 113, 114. On the other hand if the pneumatic system is functioning properly, release of the brakes from parked condition is accomplished simply by moving valve member 23 of parking valve 17 to its upper position against seat 135 and holding it there momentarily while the air pressure builds up in conduits 25, 32 and 56 to re-establish the pressure conditions in chambers 33 and to recompress springs 113, 114.

While the particular fluid operated braking system herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a vehicle braking system of the type employing separate braking assemblies for each of a plurality of wheels, each adapted to be activated to braking position by a pneumatically operated booster assembly and to be energized with pressurized air under the control of the vehicle driver; that improvement which comprises mechanically powered alternate brake setting means effective to set the vehicle brakes upon failure of said pressurized air, said mechanically powered brake setting means including means for holding said brake setting means deactivated normally by use of pressurized air, manually controlled valve means readily accessible to the vehicle driver from his normal driving position to vent pressurized air from said mechanically powered brake setting means thereby activating the latter to set and hold the brakes positively set until pressurized air is again admitted to said mechanically powered brake setting means, and pressure differential responsive check valve means in the pressurized fluid supply to said means for holding the brake setting means deactivated, said pressure differential responsive check valve being positioned downstream from said manually controlled valve whereby the opening of said check valve to vent air to the atmosphere causes an abrupt pressure drop on the downstream side of said manual valve, said check valve means including means operable to pass pressurized air to said holding means and to hold such air captive against reverse flow until the system pressure falls below a predetermined minimum operating pressure whereupon said captive air is automatically vented to the atmosphere thereby allowing said mechanically powered brake setting means to set the vehicle brakes, and pressure responsive means operatively connected with said manual valve operable by said abrupt pressure drop to close said manual valve to prevent air loss from the braking system as a whole.

2. A pneumatic braking system for vehicles of the type having a tractor and at least one trailer coupled thereto each provided with a plurality of wheels, a brake booster and an attached emergency spring-powered brake actuator connected with each wheel of said tractor and trailer, pressurized fluid means for normally holding each of said emergency actuators cocked in spring-loaded position ready to set the brakes if the system air pressure falls below a safe operating pressure and including relay valve means for maintaining a storage supply of pressurized air on said trailer available for use in actuating the brake boosters for the trailer brakes on normal demands for braking, driver controlled means on the tractor for admitting variable quantities of pressurized air to the tractor brake boosters and for simultaneously admitting pressurized air from said trailer storage tank to said trailer brake boosters, each of said emergency brake actuators being operable through an associated booster to set the tractor and the trailer brakes upon a predetermined reduction in the system pressure, a first air supply line leading from the pressurized fluid means on the tractor to the emergency brake actuators on the tractor, a second air supply line leading from the pressurized fluid means to the emergency brake actuators on said trailer, independent pressure differential check valves in said first and second air supply lines each normally closing an air vent port to the atmosphere, each of said check valves being operable to open the associated one of said vent ports to vent pressurized air from the associated ones of said brake actuators when and if the pressure in the downstream ends of said first and second air supply lines falls below a predetermined value thereby to uncock said emergency brake actuators and permit the latter to set the brakes connected therewith, a manually controlled normally open valve in said first air supply line on the upstream side of said check valve, said valve being manually moveable to a closed position venting air from the downstream end of said first air line to the atmosphere thereby to uncock said tractor emergency actuators while leaving the trailer emergency actuators fully cocked and the trailer brakes unset, said manually controlled valve in said first air supply line includes means for closing said vent port and for holding the same in its normal open position upon being returned to the position by an operator, said manually controlled valve in said first air supply line including spring means for moving the same to air venting position automatically upon abrupt failure of air pressure on the downstream side thereof caused by the operation of said check valve, and means responsive to pressure in said first air supply line for holding said manually controlled valve in air venting position once said valve is moved to the air venting position.

References Cited by the Examiner
UNITED STATES PATENTS

| | | | |
|---|---|---|---|
| 2,211,890 | 8/1940 | Farmer | 303—2 |
| 2,311,806 | 2/1943 | Almond | 303—69 X |
| 2,409,908 | 10/1946 | Simpkins | 188—152 |
| 2,757,763 | 8/1956 | Burger | 188—170 X |
| 2,923,576 | 2/1960 | Seale | 303—29 X |
| 2,948,359 | 8/1960 | Barrett | 303—2 X |
| 3,011,834 | 12/1961 | Casey | 303—71 |
| 3,020,094 | 2/1962 | Murty et al. | 303—9 |
| 3,065,997 | 11/1962 | Frankhouser et al. | 303—6 |
| 3,095,244 | 6/1963 | Valentine et al. | 303—9 |

EUGENE G. BOTZ, *Primary Examiner.*